United States Patent
Fritsche et al.

(10) Patent No.: US 6,567,007 B1
(45) Date of Patent: May 20, 2003

(54) IDENTIFIABLE ELECTRIC COMPONENT, METHOD OF IDENTIFICATION AND EVALUATION DEVICE

(75) Inventors: Georg Fritsche, Hildesheim (DE); Helmut Schmid, Hohenhameln (DE); Frank Schriefer, Dickholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,607

(22) PCT Filed: Mar. 28, 2000

(86) PCT No.: PCT/DE00/00914
§ 371 (c)(1),
(2), (4) Date: Jan. 8, 2002

(87) PCT Pub. No.: WO00/58694
PCT Pub. Date: Oct. 5, 2000

(30) Foreign Application Priority Data

Mar. 29, 1999 (DE) .......................... 199 14 004

(51) Int. Cl.[7] .............................................. G08B 21/00
(52) U.S. Cl. ..................... 340/653; 340/638; 340/657
(58) Field of Search ................. 340/635, 649, 340/650, 651, 652, 653, 664, 568.1, 657; 324/96, 103 P, 133, 537, 601

(56) References Cited

U.S. PATENT DOCUMENTS

| | | | | |
|---|---|---|---|---|
| 4,301,407 A | * | 11/1981 | Koslar | 324/96 |
| 5,124,661 A | * | 6/1992 | Zelin et al. | 324/601 |
| 5,247,245 A | * | 9/1993 | Nelson | 324/113 |
| 5,767,500 A | | 6/1998 | Cordes et al. | 340/568.1 |
| 5,781,024 A | * | 7/1998 | Bloomberg et al. | 324/763 |
| 5,783,926 A | | 7/1998 | Moon et al. | 320/106 |

FOREIGN PATENT DOCUMENTS

| | | |
|---|---|---|
| DE | 92 02 910.8 | 6/1992 |
| DE | 38 53 403 T2 | 7/1995 |
| DE | 197 47 255 A1 | 5/1999 |
| EP | 0 437 697 A | 7/1991 |

* cited by examiner

Primary Examiner—Van Trieu
(74) Attorney, Agent, or Firm—Michael J. Striker

(57) ABSTRACT

An electrical component is proposed that has at least one voltage divider that can be read out using an evaluation unit to identify the electrical component by means of a voltage measurement. An evaluation unit is first connected to the electrical component, and a voltage measurement is carried out and converted by way of an analog-digital converter into a digital code with which the electrical component can be identified. This identification can be output via a data output to an electrical device.

16 Claims, 3 Drawing Sheets

IDENTIFIABLE ELECTRIC COMPONENT, METHOD OF IDENTIFICATION AND EVALUATION DEVICE

BACKGROUND OF THE INVENTION

The invention is based on an electrical component according to the general description of the primary claim. It is known that electrical components can be identified using applied bar codes and/or type descriptions. To process this information further using an electrical device, however, the type of electrical component must also be entered manually. In computer technology, moreover, it is known that information about the identity of computer components can be queried via an interface. A fuel supply system in the form of a pump is made known in U.S. Pat. No. 4,487,181, in which the data from the pump are recorded on the pump housing during a test phase. This test recording is carried out in the form of a resistor network, with the values of the resistors representing information about the data from the pump during the test phase. Transmission to a control system is made possible by way of a cable connection.

SUMMARY OF THE INVENTION

In contrast, the electrical component according to the invention has the advantage that information about the identity of the electrical component is collected by measuring a voltage at a voltage divider, which is part of a resistor network in the electrical component. This is particularly advantageous because the divided voltage that can be drawn from the voltage divider is independent of the absolute values of the resistors in the resistor network and only depends on the ratio of the resistors in the voltage divider. In particular, a temperature dependence of the resistors is eliminated in the voltage measurement, and it can therefore no longer lead to mistaken identification of the electrical component. A further advantage is the fact that a voltage measurement can be carried out using a measuring device having a very high internal resistance. The measurement can therefore be carried out using very low currents.

Furthermore, it is advantageous to design the resistor network as a multitude of parallel circuits of series circuits of two-ohm resistors, and to tap a voltage between each of the two resistors connected in series and to measure it against a fixed reference potential. Since the number of potential voltage values is unlimited due to the tolerances of the resistors and a limited resolution of the measuring device, the scope of the storable information used to identify the electrical component can be increased by using an arrangement of a multitude of series circuits. It is also advantageous that the values of the resistors in the resistor network are selected in graduations, so that, at the specified reference voltage, only voltage values can be measured up to the reference voltage, the tolerance ranges of each of which is disjoint. This makes it possible to unequivocally assign a measured voltage value to a theoretical voltage value that is used to subsequently identify the electrical component.

It is also advantageous that the electrical component has an input for a reference voltage. As a result, a measuring device does not depend on a supply voltage of the electrical component. This is sensible in particular when the electrical component has not yet been activated at the time of identification and is therefore not yet supplied with operating voltage. Moreover, the voltage applied to the electrical component may fluctuate, so that a measurement could possibly lead to incorrect identification. If the reference voltage is applied to the electrical component from the outside, this voltage can be checked directly using a measuring unit.

It is also advantageous to provide a method for identifying the electrical component, by means of which the voltage is measured at at least one resistor of the voltage divider, and information is determined by the evaluation unit that makes it possible to identify the electrical component. The measured voltage is hereby converted into a signal that can be processed further.

It is also advantageous to convert the measured voltage to a digital code using an analog-digital converter. This eliminates measuring errors that occur as a result of resistor tolerances or voltage drop at the supply leads, as well as inaccuracy of the measuring device. Moreover, a digital code makes further processing by way of a central processor possible.

It is also advantageous to use direct voltage as the reference voltage, because, unlike with alternating voltage, the resistor values are not frequency-dependent with direct voltage, as with capacitive or inductive loads.

It is also advantageous that the digital code of the analog-digital converter is fed further to a central processor that compares the digital code with stored digital codes and, if the code determined matches a stored digital code, the type of device can be called up from the memory unit and transmitted to an output unit or a data output. The device can therefore be identified even in the evaluation unit, so that a type of device can be displayed at the output unit or transmitted to a further central processor.

It is also advantageous that the digital code is fed further from the evaluation unit directly to a second central processor, whereby the device is identified directly by the evaluation unit or the second central processor with access to a second memory unit. It is advantageous thereby that data for the operation of the electrical device can be loaded from the second memory unit by way of the second central processor. A situation in which the user must manually select the electrical component that is present or insert a special data carrier into the second memory unit that only carries data for the operation of the electrical component is thereby prevented. Moreover, only one medium for a line of products in which different variants of electrical components are used, only one medium for the memory unit need be created.

It is advantageous thereby that, depending on the identification of the electrical component, the data required to operate the electrical component are automatically loaded in the second memory unit, if one is available.

It is also advantageous to provide an evaluation unit having an analog-digital converter that converts the voltages measured at the electrical component into a digital code, because they can be processed further by a central processor. It is also advantageous to provide the evaluation unit with a central processor and a memory unit by means of which the digital code can be assigned to a type of device stored previously in the memory unit; because the type of device can then be displayed directly by the evaluation unit, or it can be transmitted to a further central processor, for example.

DESCRIPTION OF THE PREFERRED EMBODIMENTS

Figure 1:
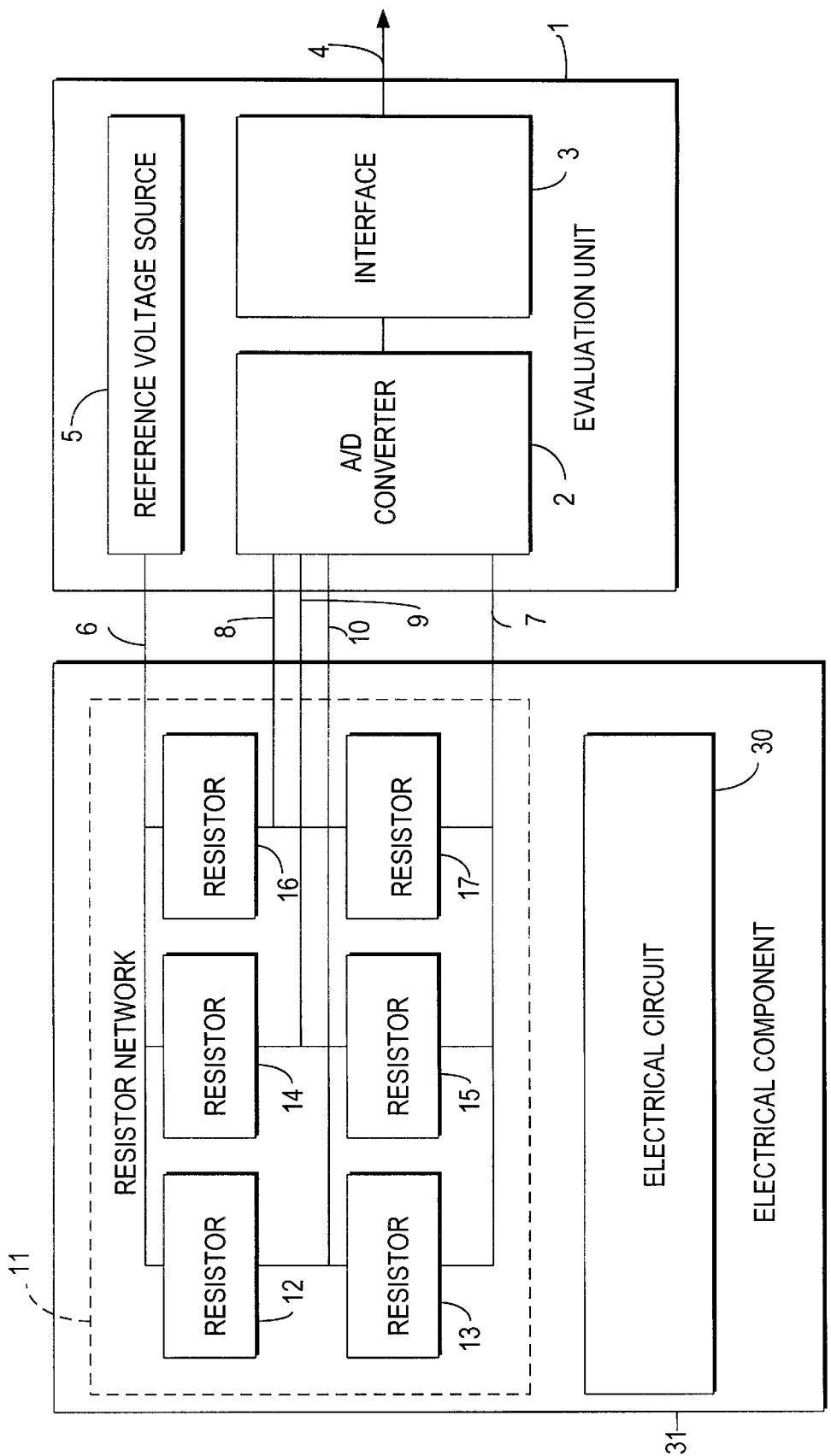
FIG. 1 shows an electrical component according to the invention having an evaluation unit according to the invention.

An electrical component 31 having an electrical circuit 30 is shown in FIG. 1. Moreover, the electrical device 31 has a resistor network 11 comprising a first resistor 12, a second resistor 13, a third resistor 14, a fourth resistor 15, a fifth resistor 16, and a sixth resistor 17. The electrical device 31 is connected to an evaluation unit 1. The connection takes place by way of a reference voltage line 6, a first data line 8, a second data line 9, a third data line 10, and a grounding conductor 7. The evaluation line 1 has a reference voltage source 5, an analog-digital converter 2, an interface 3, and a data output 4. In the resistor network 11, the first resistor 12, the third resistor 14, and the fifth resistor 16 are each connected with a connection to the reference voltage line 6 and, therefore, with the reference voltage source 5 in the evaluation unit 1. The first resistor 12 is connected with its other connection, the second resistor 13, and the third data line 10. The third resistor 14 is connected with its other output, the fourth resistor 15, and the second data line 9. The fifth resistor 16 is connected with its other output, the sixth resistor 17, and the first data line 8. Each of the three data lines 8, 9, 10 lead to an input of the analog-digital converter 2 in the evaluation unit 1. The second resistor 13, the fourth resistor 15, and the sixth resistor 17 are all connected with the grounding conductor 7, to which the evaluation unit 1 is also connected. All resistors used in the resistor network are thereby resistors having two connections that are designed, for instance, as carbon film resistors, as SMD components, or as microstructure components in a miniaturized semiconductor device.

The resistor network 11 is independent of the electrical module 30 of the electrical component 31. The electrical module can have any mode of operation. Data inputs, data outputs and a voltage supply are not shown in FIG. 1. The electrical module can comprise passive components, semiconductor devices, central processors, memory units, and display units and actuators, for example.

In a first process step, the evaluation unit 1 is connected to the electrical component, particularly to the resistor network 11, by way of the reference voltage line 6, the first, second, and third data lines 8, 9, 10, and the grounding conductor 7. This connection can be created using a plug-in connection, in which either the evaluation unit is connected directly with the electrical component, or in which a wire junction exists between the evaluation unit 1 and the electrical component 31. It is also possible to provide the evaluation unit 1 and the electrical component 31 on a printed-circuit board and thereby create the connection by way of circuit-board conductors in each case. The connection can be permanent or interruptible, as is possible with a plug-in connection in particular. In a second process step, reference voltage from the reference voltage source 5 is now applied to the resistance network 11 by way of the reference voltage line 6. The reference voltage is thereby applied to the first and second resistors 12, 13, to the third and fourth resistors 14, 15, and to the fifth and sixth resistors 16, 17 due to the parallel circuit, whereby each of the two resistors forms a voltage divider. The way that information can be transmitted to the evaluation unit in a third method step will now be explained using the first and second resistors 12, 13. The voltage that is applied at the connection of the third data line between the first resistor 12 and the second resistor 13 across from the grounding conductor 7, for example, is given by the ratio of the first resistor 12 to the second resistor 13. If a reference voltage of 10 volts is now applied, and the first resistor, for example, has a value of 100 ohm, and the second resistor 13 has the value 300 ohm, then ¾ of the voltage apparently drops off after the second resistor 13. Compared to a reference potential of ground, a voltage of 7.5 volts is therefore applied to the second resistor 13. The value of 7.5 volts is measured by the analog-digital converter in a third process step and converted to a digital code. The analog-digital converter is thereby designed as a voltage measuring unit having a high internal resistance, preferably greater than 1 MΩ. For example, the number 3 can be assigned to the value of 7.5 volts as the digital code. Further possible resistor combinations for the first resistor 12 and the second resistor 13 can then be, for example, that the first resistor 12 has the value 300 ohms and the second resistor 13 has the value 100 ohms, or that both resistors have the value 200 ohms. If one now assumes that the resistors have a tolerance of 5%, then, in the case in which the first resistor 12 has a value of 300 ohms, the second resistor 13 has a value of 100 ohms, a voltage within a range of 2.3 to 2.7 volts can be measured at the third data line 10 with a reference voltage of 10 volts. If both resistors have a value of 200 ohms, a voltage of 4.8 to 5.2 volts can be measured. If the third resistor 13 has the value 300 ohms, and the first resistor 12 has the value 100 ohm, then a voltage in the range of 7.3 to 7.7 volts can be measured. In this embodiment, the analog-digital converter will now assign a digital value of 1 to all voltages measured in the range 2.3 to 2.7 volts, a value of 2 to all voltages measured in the range 4.8 to 5.2 volts, and, as described above, a value of 3 to all voltages measured in the range 7.3 to 7.7 volts. Since other resistance combinations are not permitted in this embodiment, an error message will be generated if any other voltages are measured by the analog-digital converter. Since the tolerance ranges around the individual voltage values of 2.5, 5.0, and 7.5 volts are disjoint, is it possible to detect an error, on the one hand, and, on the other, to unequivocally assign a voltage value to a code. It is therefore also possible to select the reference voltage as the reference potential. The tolerance range is selected to be at least so wide that all measured values made possible by resistor errors safely lie within this tolerance range.

Since the reference voltage of 10 volts is applied to the third resistor 14 and the fourth resistor 15, as well as to the fifth resistor 16 and the sixth resistor 17 in the same fashion as to the first resistor 12 and the second resistor 13, if applicable, a divided voltage can be tapped between the two resistors by way of the second data line 9 or by way of the first data line 8, respectively. Using an identical, possible resistor selection, an input voltage in the analog-digital converter 2 is also possible in similar fashion for the first and second data line 8, 9. The analog-digital converter has a separate input for each of the three data lines. The analog-digital converter, which queries the three data lines simultaneously or consecutively, now combines the number determined for each data line into one digital code that comprises three places, whereby each place can have the value 1, 2, or 3. In a fourth process step, the digital code is transmitted to an interface 3 and it can be tapped from the evaluation unit by way of a data output 4. The interface 3 can be an interface typically found in computer applications, e.g., a serial or parallel interface, or an interface typically found in a motor vehicle, e.g., an interface to a CAN bus. This transmission represents the fourth process step. The code taken from the data output can now be used by an external unit—not shown—to inform a user about the identity of the electrical component 31. Moreover, an external unit can be informed as to which electrical component 31 is present, whereby the external unit is hereby enabled to specifically access the electrical component 31, to control the electrical component 31, to read out information from the electrical component 31, or to load software that finally makes it possible for the external unit to operate the electrical component 31. The external unit is preferably a navigation device and/or a radio and/or a mobile communication unit in a motor vehicle. The electrical component is thereby preferably a component that is used in a multitude of named devices, that requires a special software, however, depending on its use in the various devices, or the device preferably requires this special software to operate the electrical component 31.

The number of resistors shown in FIG. 1 is to be considered as just one potential embodiment. It is also possible to provide just one series circuit of two resistors, in which a measuring voltage is tapped between the two resistors and fed to the input of an analog-digital converter in advantageous fashion. It is also possible to increase the number of voltage dividers connected in parallel in the form of two resistors each connected in series in the resistor network 11. A data line is to be added for each additional series circuit, which connects the input of a measuring unit, preferably an analog-digital converter, with a point between each of the two resistors. It is also possible thereby that the individual resistors, e.g., the first resistor 12 itself, is formed from a multitude of resistors connected in series or in parallel. In this example, for instance, the resistance of 300 ohms can be formed by three 100-ohm resistors connected in series, whereby a tolerance range that may have been changed must be taken into consideration. It is also possible to bridge the first resistor 12, for example. The entire reference voltage then drops off at resistor 13 as measured against the ground. It is also possible to replace the second resistor 13, e.g., using bridging. In this case, the earth potential is applied at the third data line 10, and the entire voltage drops off at the available, first resistor 12. It is therefore possible that the full extent of the reference voltage as well as ground can be applied at an input of the analog-digital converter. As a result, the number of possible voltage values—which can be specified by the ratio, e.g., of the first resistor 12 to the second resistor 13—can be increased.

Figure 2:
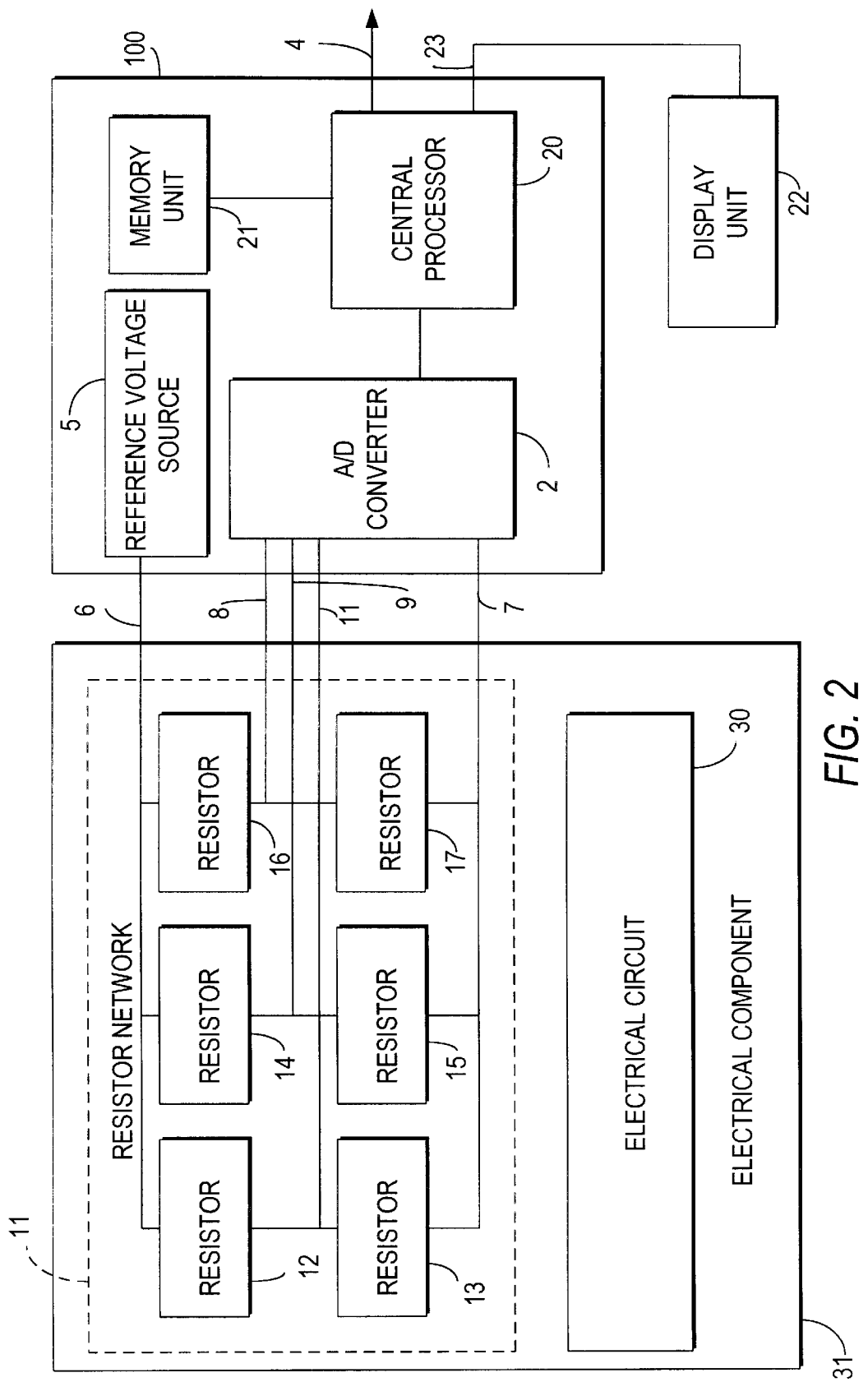
FIG. 2 shows an electrical component according to the invention having another evaluation unit according to the invention.

In FIG. 2, an electrical component 31 is also connected to an evaluation unit 100. In this figure and the following figures, the same reference symbols indicate the same components. The evaluation unit 100 in FIG. 2 differs from the evaluation unit 1 in FIG. 1 in that the analog-digital converter 2 is connected to a first central processor 20, which, in turn, can access a first memory unit 21. The central processor 20 has a first data output 4 and a second data output 23. The second data output 23, in turn, is connected to a display unit 22. The code determined by the analog-digital converter regarding the identification of the electrical component 31 is fed further to the central processor 20 in the evaluation unit 100. The first central processor 20 now accesses the first memory unit 21, and compares the digital code obtained from the analog-digital converter 2 with the digital code stored in the first memory unit 21. A type of electrical component is stored there for the digital code stored in the memory unit 21. If the first central processor 20 now finds a digital code in the first memory unit 21 that was transmitted accordingly by the analog-digital converter 2, the central processor 20 calls up the corresponding type of electrical component 31 from the first memory unit. The type of electrical component is now fed further to an external device by way of the same data output 4 in the same fashion as described in FIG. 1, for example. It is also possible to feed the information about the type of electrical component further to an output unit 22. The output 22 can be designed as a display unit, for example, in which the type of electrical component 31 is displayed to the user.

The first central processor 20 is thereby preferably designed as a microprocessor or a microcontroller. The first memory unit 21 is preferably a semiconductor device, in which digital codes are assigned to different types of electrical components 31. The first memory unit 21 is thereby designed as an EEPROM, for example.

Figure 3:
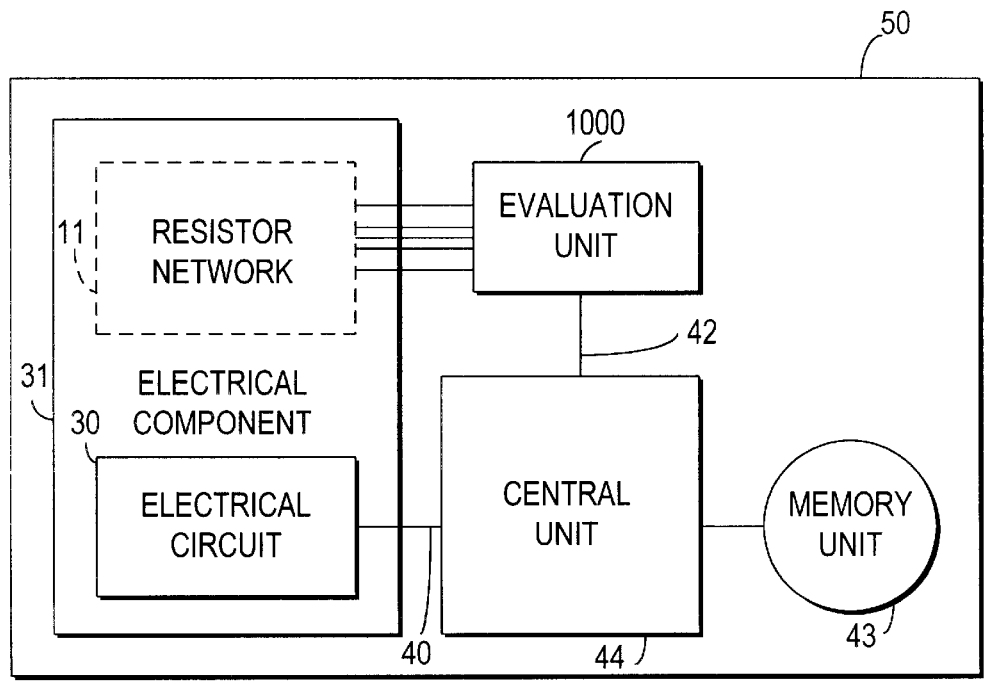
FIG. 3 shows an electrical component according to the invention in an electrical device, with the electrical component connected to an evaluation unit according to the invention.

An electrical device 50 is shown in FIG. 3 that has at least one electrical component 31 that is designed according to the invention and, as described in FIGS. 1 and 2, is connected to an evaluation unit 1000. The evaluation unit 1000 can thereby be designed like the evaluation unit 1 in FIG. 1, or like the evaluation unit 100 in FIG. 2. The evaluation unit 1000 is connected to a central unit 44 of the electrical device 50 by way of a data connection 42. The central unit 44, in turn, is connected to a second memory unit 43. The central unit 44 is also connected by way of a data connection 40 to the electrical device 31, particularly at least one electrical module 30 of the electrical device 31.

An element of information about the identity of the electrical component 31 is now fed further by the evaluation unit 1000 by way of the data output 4 not shown in FIG. 3 by way of the data connection 42. In the design of the evaluation unit 1000 according to the type of evaluation unit 1, this is a digital code determined by an analog-digital converter. If the evaluation unit 1000 is designed according to the type of evaluation unit 100 in FIG. 2, the type of electrical component 31 is transmitted directly from the first central processor 20 to the central unit 44. This can be transmitted as a sequence of numbers or a name of the device in the form of a text string, for example. If the evaluation unit 1000 is designed like the evaluation unit 100 as shown in FIG. 2, the central unit 44 no longer needs to understand how the special resistor network 11 is designed, nor how the identity information about the electrical component was determined. In the central unit 44, the second memory unit 43 can now be accessed, from which data—depending on the identity of the electrical component 31—for operating the electrical component can now be loaded into the central unit 44. These data, preferably a program for controlling the electrical component, now make it possible that the central unit 44, by way of the data connection 40, can control the electrical component, especially at least one electrical module 30 of the electrical component 31, or it can receive information from the electrical component 31 by way of the data connection 40. The data connections 40 and 42 are thereby designed as cables, for example. For the case in which the central unit 44 and the electrical component 31 with the electrical module are arranged on a printed-circuit board, the data connections 40 and 42 can also be designed as circuit-board conductors. The second memory unit 43, like the first memory unit 31, can be designed as a semiconductor device, but it is preferably designed as a memory unit having a changeable storage medium. The memory unit 43 is then preferably designed as a drive for a magnetic and/or optical data carrier, such as a diskette, CD, or magneto-optic data carrier. Data for the operation of various electrical components 31 are thereby preferably available in the memory unit 43, so that the data carrier in the second memory unit 43 does not need to be changed, even when different electrical components 31 are used in one electrical device 50. It is also provided that data are loaded from the second memory unit into the central unit 44 only or automatically when a storage medium is available in the second memory unit 43 that contains data for the electrical component 31 determined by the evaluation unit 1000.

The central unit 44 is thereby preferably designed as a central processor having a memory, which is not shown. A voltage supply of the individual components such as data inputs and outputs of the electrical device 50 are not shown in FIG. 5. The electrical device 50 is therefore a vehicle navigation system having a GPS antenna, an input unit, an output unit in the form of a screen display and/or an acoustic output, as well as a stored digital street map.

Figure 4:
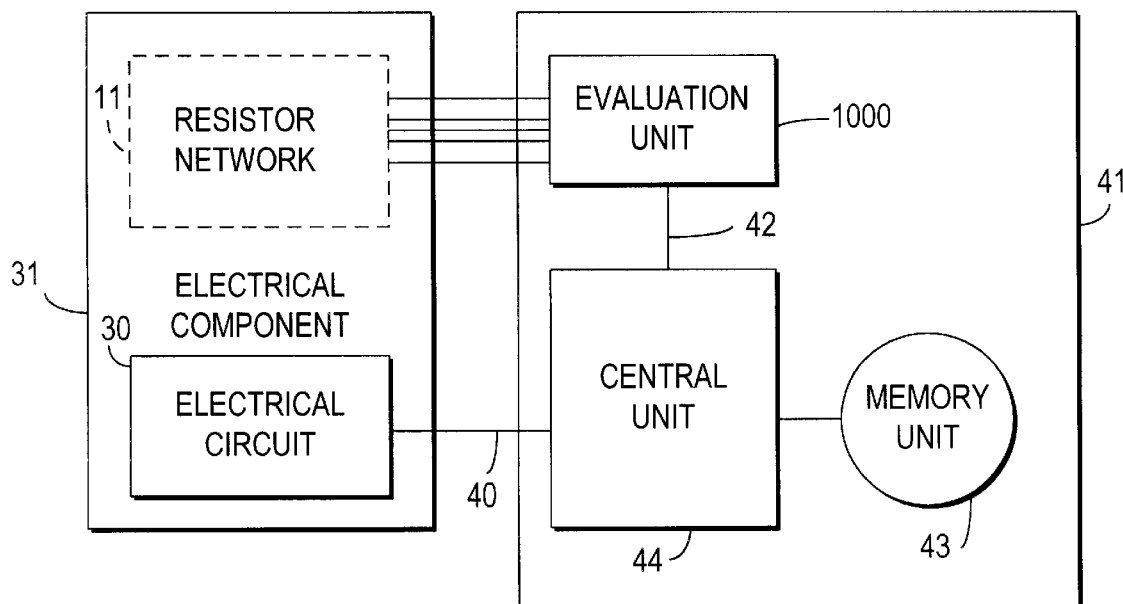
FIG. 4 shows an electrical component that is connected with an evaluation unit in an electrical device.

An electrical device 41 is shown in FIG. 4 that is designed with an electrical component 31 connected outside the housing of the electrical device 41. When used in a vehicle, for example, the electrical component 31 can now be situated in a vehicle in any location in the vehicle and connected with the electrical device 41 by way of a wire junction. The mode of operation corresponds further to the design shown in FIG. 3.

What is claimed is:

1. An electrical component, comprising at least two externally accessible electrical contacts; a resistor network for identifying the electrical component and connected with said electrical contacts, said resistor network including a multitude of parallel circuits of series circuits each having two ohm resistors, such that a voltage measured between each of the two resistors against a reference potential is tappable from outside via said electrical contacts, and the electrical component is identifiable by measuring individual voltages.

2. An electrical component as defined in claim 1, wherein said resistor network is formed so that values of said resistors are selected in graduation, and only voltage values up to a value of a reference voltage are measurable, and tolerance ranges of each of the voltage values is disjoint so as to detect an error and also inequivocally assign a voltage value to a code.

3. An electrical component as defined in claim 1; and further comprising an input for a reference voltage, said input being connected with said resistor network.

4. A method for identifying an electrical component, comprising the steps of bringing an evaluation unit in contact by at least two electrical contacts with an electrical component having a resistor network; applying an electrical reference voltage to a multitude of voltage dividers; measuring an applied voltage by the evaluation unit at resistors of the voltage divider, and outputting an element of information based on the measured voltage by the evaluation unit, so as to identity the electrical component.

5. A method as defined in claim 4; and further comprising assigning a digital code to a measured voltage by an analog-digital convertor that is then used to identify the electrical component.

6. A method as defined in claim 5; and further comprising feeding the digital code determined by the analog-digital converter to an interface; an outputting via a data output.

7. A method as defined in claim 5; and further comprising feeding the digital code to a first central processor which can access a first memory unit in which an assignment of an output signal to a certain device is stored; and communicating a first central processor to a unit selected from the group consisting of a data output unit and an output unit what the device is.

8. A method as defined in claim 5; and further comprising feeding the digital code to a second central processor that access a second memory unit, from which data used to operate a device are loadable by a central processor.

9. A method as defined in claim 4; and further comprising providing the reference voltage by the evaluation unit.

10. A method as defined in claim 4; and further comprising using a direct voltage as the reference voltage.

11. A method as defined in claim 4; and further comprising measuring a ratio of the voltage at a resistor to a reference voltage, by a ratio of the resistors in the voltage divider.

12. An evaluation device for identifying an electrical component, comprising an analog-digital convertor; a data input; at least one data output; an evaluation unit connected to an electrical component via said data input by at least two electrical contacts, wherein a digital code is assignable to the measured voltages by said analog-digital convertor; a multitude of voltage dividers to which an electrical reference voltage is applied and an applied voltage is measurable by the evaluation unit at the resistors of the voltage divider, wherein an element of information based on the measured voltage by the evaluation unit is outputted so as to identify the electrical component.

13. An evaluation device as defined in claim 12; and further comprising a voltage source provided for a reference voltage and situated in said evaluation unit.

14. An evaluation device as defined in claim 12, wherein said evaluation unit has a central processor and a memory unit by which a digital code can be assigned to a type of device stored previously in the memory unit.

15. An evaluation device as defined in claim 12; and further comprising a display unit connected to said evaluation unit and controllable by a central processor and in which a type of device identified is displayable.

16. An evaluation device as defined in claim 12; and further comprising a second central processor connected to a said evaluation unit and connected to a second memory unit, from which data based on the digital code determined by the evaluation unit and used to operate the electrical device are loadable.

* * * * *